(12) United States Patent
Chen et al.

(10) Patent No.: US 12,052,811 B1
(45) Date of Patent: Jul. 30, 2024

(54) COOPERATIVE SYNCHRONOUS CONTROL SYSTEM FOR PLURALITY OF POWER UTILIZATION MODULES

(71) Applicant: LAMXON TECHNOLOGY BUILDING MATERIALS CO., LTD., Dongguan (CN)

(72) Inventors: Qingyuan Chen, Dongguan (CN); Chihsu Tu, Dongguan (CN); Qiang Chen, Dongguan (CN); Xinwei Li, Dongguan (CN)

(73) Assignee: LAMXON TECHNOLOGY BUILDING MATERIALS CO., LTD., Dongguan (CN)

( * ) Notice: Subject to any disclaimer, the term of this patent is extended or adjusted under 35 U.S.C. 154(b) by 0 days.

(21) Appl. No.: 18/424,732

(22) Filed: Jan. 26, 2024

(30) Foreign Application Priority Data

Dec. 12, 2023 (CN) .......................... 202311705389.5

(51) Int. Cl.
| | |
|---|---|
| *H05B 47/19* | (2020.01) |
| *H05B 47/105* | (2020.01) |
| *F21S 8/00* | (2006.01) |

(52) U.S. Cl.
CPC .......... *H05B 47/19* (2020.01); *H05B 47/105* (2020.01); *F21S 8/00* (2013.01)

(58) Field of Classification Search
CPC .......... H05B 47/19; H05B 47/105; F21S 8/00
See application file for complete search history.

(56) References Cited

U.S. PATENT DOCUMENTS

| | | | |
|---|---|---|---|
| 10,932,349 B1* | 2/2021 | Westrick, Jr. .......... | H05B 47/16 |
| 2019/0230772 A1* | 7/2019 | Reiss ................. | H05B 47/1965 |

FOREIGN PATENT DOCUMENTS

| | | |
|---|---|---|
| CN | 206559074 U | 10/2017 |
| CN | 213240837 U | 5/2021 |
| CN | 218161792 U | 12/2022 |

\* cited by examiner

*Primary Examiner* — Alexander H Taningco
*Assistant Examiner* — Pedro C Fernandez
(74) *Attorney, Agent, or Firm* — Nitin Kaushik

(57) ABSTRACT

The present invention relates to the technical field of lamp mirrors, in particular to a cooperative synchronous control system for a plurality of power utilization modules, including the plurality of power utilization modules. The working mode is: B. when any power utilization module generates a control instruction, controlling, by a main controller of the power utilization module, the power utilization module according to the instruction to perform a related action, and transmitting the instruction through a wireless transmitter to the outside; and C. receiving, by other power utilization modules, the instruction respectively through a wireless receiver, analyzing the instruction by the main controller, and performing a related control action. A control group is formed by the plurality of power utilization modules, and any power utilization module can generate the control instruction to control all the power utilization modules, thereby flexibly realizing the cooperative synchronous work and simplifying control.

8 Claims, 3 Drawing Sheets

… (1)

COOPERATIVE SYNCHRONOUS CONTROL SYSTEM FOR PLURALITY OF POWER UTILIZATION MODULES

CROSS-REFERENCE TO RELATED APPLICATIONS

The application claims priority to Chinese patent application No. 2023117053895, filed on Dec. 12, 2023, the entire contents of which are incorporated herein by reference.

TECHNICAL FIELD

The present invention relates to the technical field of lamp mirrors, in particular to a cooperative synchronous control system for a plurality of power utilization modules.

BACKGROUND

A lamp mirror is a mirror with a lighting function, and is commonly used in bathrooms, public toilets and other areas at present. The lamp mirror is arranged on a cabinet door of a cabinet, so that the cabinet becomes a mirror cabinet.

For hotels and other public places, to improve the visual effect of hotels, very long mirrors are usually provided. These mirrors are usually equipped with LED lamps. The LED lamps emit light in a low-brightness situation, so that the experience of hotel guests can be improved.

The existing lamp mirror is generally one lamp mirror equipped with one control system. In a case that it is necessary to control a plurality of lamp mirrors at the same time, it is usually necessary to control the lamp mirrors one by one, which is very troublesome. Based on this problem, the commonly used solution is: the lamp mirror serves as a general control, other lamp mirrors serve as controlled objects, and a control instruction is generated and transmitted by the general control, so that the controlled objects perform related actions and the plurality of lamp mirrors can perform dimming synchronously.

Apparently, in the above solution, in a case that it is necessary to control all the lamp mirrors to perform actions through the general control, and the controlled objects only can control themselves to perform actions and cannot interfere with the actions of other lamp mirrors, resulting in a single control mode and low flexibility.

SUMMARY

In view of the problems in the prior art, the present invention provides a cooperative synchronous control system for a plurality of power utilization modules, so that each power utilization modules can separately control all power utilization modules, thereby making the control more flexible.

To solve the above technical problems, the present invention adopts the following technical solutions:

the present invention provides a cooperative synchronous control system for a plurality of power utilization modules, including the plurality of power utilization modules, where the power utilization modules are intelligent lamp mirrors or mirror cabinets; each of the power utilization modules includes a main controller, power utilization blocks each in signal connection with the main controller, a wireless receiver and a wireless transmitter; and a driving block is configured to control the on and off of the power utilization blocks and adjusting the brightness of the power utilization blocks. The working mode of the cooperative synchronous control system is as follows:

B. when any one of the power utilization modules generates a control instruction, controlling, by a main controller of the power utilization module, the power utilization module according to the instruction to perform a related action, and transmitting the control instruction through a wireless transmitter to the outside at the same time; and C. receiving, by other power utilization modules, the control instruction respectively through a wireless receiver, analyzing the instruction by the main controller, and performing a related control action.

Further, before Step B, the working mode further includes: A. generating, by at least one of the power utilization modules, a group request, and receiving the group request by other power utilization modules, so that at least two of the power utilization modules form a control group.

Further, Step B specifically includes:

B1. receiving, by the power utilization module, an action according to an input signal, and generating a control instruction;

B2. controlling, by a main controller of the power utilization module receiving the signal, the power utilization block according to the control instruction through the driving module to perform a related action; and B3: transmitting the control instruction by one of the following two modes:

encrypting, by the main controller of the power utilization module receiving the signal, the control instruction, and then transmitting the control instruction locally by the wireless transmitter; and using a specific frequency band of the control group by the main controller of the power utilization module receiving the signal to perform local transmission through the wireless transmitter; and Step C specifically includes:

C1. receiving, by other power utilization modules in the control group, an encrypted control instruction respectively through the wireless receiver;

C2. decrypting, by other power utilization modules in the control group, the control instruction respectively through the main controller; in a case that the decryption is successful, performing a related action according to the control instruction and then performing Step C3; and in a case that the decryption fails, skipping receiving the control instruction;

C3. transmitting, by other power utilization modules in the control group, a successful execution signal respectively through the wireless transmitter, and receiving the signal by the power utilization module sending the encrypted control instruction; and C4. determining, by the power utilization module sending the encrypted instruction, according to the received successful execution instruction, whether all the power utilization modules of the control group execute the instruction successfully; in a case that all the power utilization modules of the control group execute the instruction successfully, stopping transmitting the control instruction; and in a case of determining that not all the power utilization modules execute the instruction successfully within time t, warning by the power utilization module sending the encrypted instruction, where t is a positive real number.

Further, in Step C2, after other power utilization modules in the control group are decrypted and the related action is performed according to the control instruction, in addition to performing Step C3, the following actions are performed:

C3'. transmitting, by other power utilization modules in the control group, the encrypted control instruction through the wireless transmitter, so that all other power utilization modules in a wider range are capable of receiving the encrypted control instruction; and in a case that any one of the power utilization modules receives the successful execution signal, transmitting the successful execution signal by the power utilization module so as to ensure that the power utilization module encrypting the instruction receives the successful execution signal.

Further, between Step B2 and Step B3, the working mode further includes:

determining whether the control instruction is executed by the power utilization module or the group, skipping performing Step B3 in a case that the control instruction is executed by the power utilization module, and performing Step B3 in a case that the control instruction is performed by the group.

Further, in a case that any one of the power utilization modules wants to quit the control group, the following steps are performed:

inputting an exit instruction through administrator permissions;

encrypting the exit instruction by the main controller, and then transmitting the exit instruction by the wireless transmitter to other power utilization modules of the control group;

after other power utilization modules of the control group receive and decrypt the exit instruction, deleting identity information of the power utilization module quitting the control group stored by the main controller; and deleting an encryption rule for the power utilization module quitting the group.

Further, the power utilization block includes a lighting module and a demisting module; the lighting module is used for lighting; and the main controller is further connected to a humidity sensor and a touch module. The demisting module is configured to demist a mirror surface of the power utilization module, specifically including:

S1. sensing a humidity of the mirror surface of the power utilization module by the humidity sensor, and in a case that the mirror surface humidity of the power utilization module is greater than a preset value, performing Step S2;

S2. controlling, by the main controller, the demisting module to turn on, and heating and demisting the mirror surface of the power utilization module by the demisting module; and S3. generating a demisting instruction by the main controller, and transmitting the demisting instruction by the wireless transmitter, so that all other power utilization modules in the control group turn on the demisting module.

Further, the cooperative synchronous control system controls different power utilization modules to perform lighting with different brightness, specifically including:

setting the serial number for each power utilization module joining the control group according to an established order;

selecting a preset lighting mode for execution; and according to the serial number of the corresponding power utilization module, performing lighting by the main controller according to a preset brightness, wherein the order of each power utilization module is set according to the main controller of each power utilization module, is transmitted to other individuals by the wireless transmitter of each power utilization module, and is stored by the main controller of each power utilization module.

Further, the lighting mode is input into the control group by the following ways:

performing wired connection between a terminal and any power utilization module in the control group;

inputting the lighting mode into the main controller of the power utilization module by the terminal; and transmitting, by the main controller of the power utilization module, the lighting mode to all the power utilization modules in the control group through the wireless transmitter.

Further, the inputting the lighting mode into the main controller of the power utilization module by the terminal specifically includes:

transmitting, by the terminal, the lighting mode completed in advance to the main controller of the power utilization module;

inputting a lighting mode pre-execution instruction through the terminal or the touch module; and comparing, by the main controller of the power utilization module, the number n of the power utilization modules in the control group with the number m of the power utilization modules required to execute the lighting mode, transmitting the lighting mode to other power utilization modules in the control group in a case that n≥m, and warning the terminal or giving an alarm in a case that n<m.

The present invention has the beneficial effects: according to the present invention, any one of the power utilization modules can generate the control instruction to control all the power utilization modules, so that the cooperative synchronous work of the plurality of power utilization modules can be realized flexibly, thereby simplifying the control.

Figure 1:
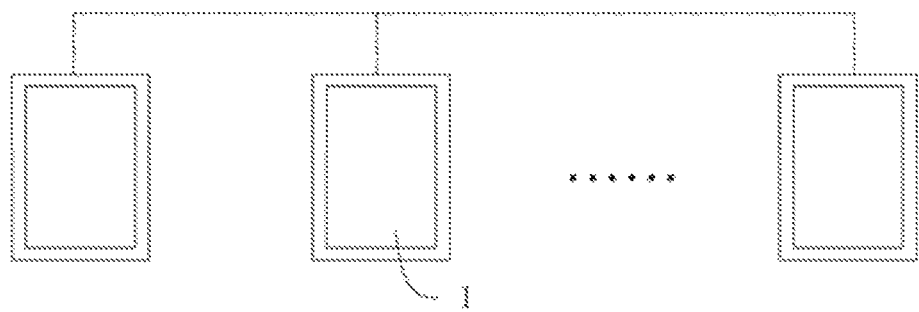
FIG. 1 is a schematic diagram of the present invention.

Reference numerals of the drawings: 1—power utilization module, 2—base, 3—mirror surface, 4—main controller, 5—power utilization module, 6—wireless receiver, 7—electronic control module, 8—wireless transmitter, 9—lighting module, 10—demisting module, 11—humidity sensor, 12—touch module.

DETAILED DESCRIPTION OF THE EMBODIMENTS

To facilitate the understanding of those skilled in the art, the present invention will be further described in conjunction with embodiments and accompanying drawings, and the contents mentioned in the embodiments are not intended to limit the present invention. The present invention is described in detail below with reference to the accompanying drawings.

Figure 2:
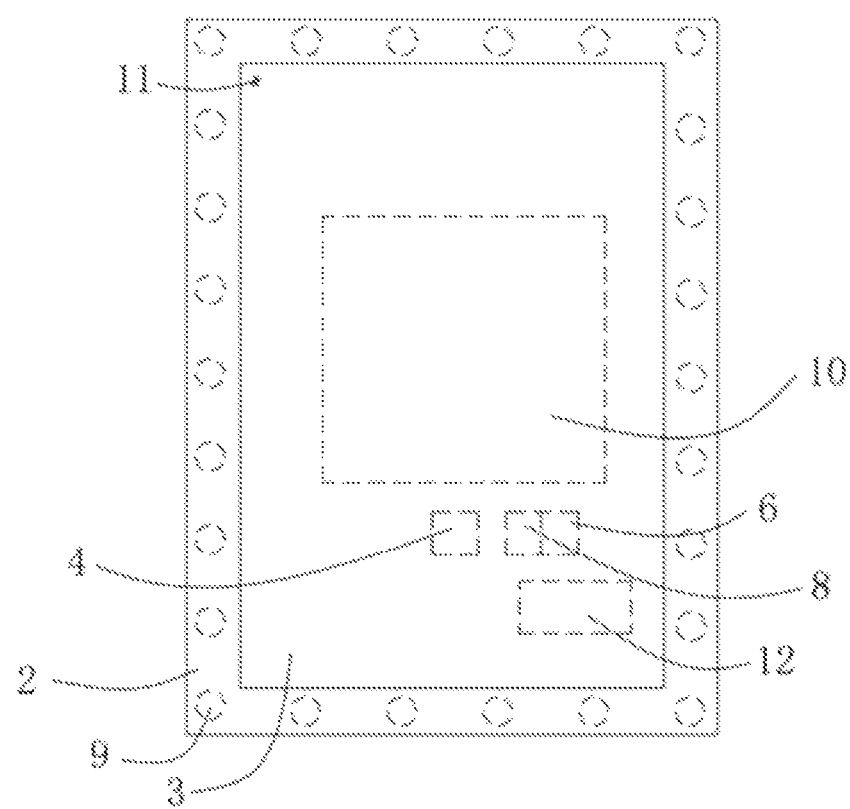
FIG. 2 is a schematic diagram of a power utilization module according to the present invention.
Figure 3:
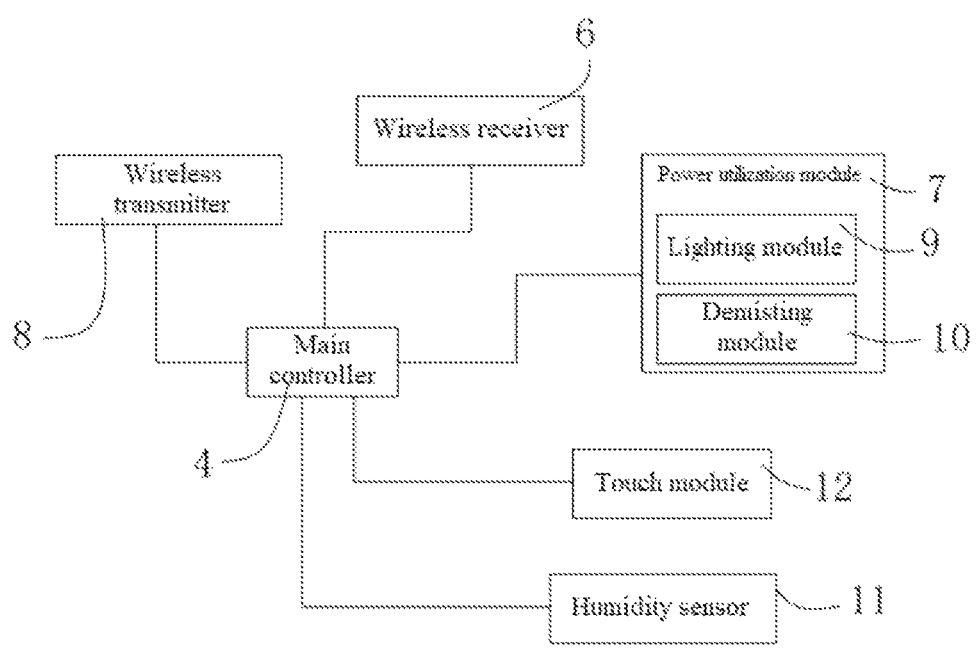
FIG. 3 is a block diagram of an electronic control principle of a power utilization module according to the present invention.

As shown in FIG. 1 to FIG. 3, the present invention provides a cooperative synchronous control system for a plurality of power utilization modules, including the plurality of power utilization modules 1; the power utilization modules 1 are intelligent lamp mirrors or mirror cabinets; each of the power utilization modules 1 includes a main controller 4, power utilization blocks 5 each in signal connection with the main controller 4, a wireless receiver 6 and a wireless transmitter 8; a driving block is configured to control the on and off of the power utilization modules 5 and adjust the brightness of the power utilization blocks 5; in addition, the power utilization modules 1 include conventional structures of the lamp mirrors/mirror cabinets, for example: a base 2 and a mirror surface 3 mounted on the base 2, and the main controller 4 and other electronic control modules are arranged on the base 2.

The working mode of the cooperative synchronous control system is as follows:

B. when any one of the power utilization modules 1 generates a control instruction, a main controller 4 of the power utilization module 1 controls the power utilization module according to the instruction to perform a related action, and transmits the control instruction through a wireless transmitter 8 to the outside at the same time; and C. other power utilization modules 1 receive the control instruction respectively through a wireless receiver 6, the main controller 4 analyzes the instruction, and a related control action is performed.

Specifically, a worker can generate the control instruction through any one of the power utilization modules 1, the control instruction is executed by the power utilization module 1 and is also transmitted by the wireless transmitter 8. After receiving the control instruction, other individuals 1 in the local range performs corresponding actions, respectively. Therefore, any one of the power utilization modules 1 can control all the power utilization modules 1 to perform actions such as dimming, heating and demisting, thereby making the control more flexible and convenient.

In this embodiment, before Step B, the working mode further includes: A. at least one of the power utilization modules 1 generates a group request and other power utilization modules 1 receive the group request, so that at least two of the power utilization modules 1 form a control group.

In short, according to the present invention, the control group is formed by at least two power utilization modules 1, and each power utilization module 1 in the control group is equal, that is, any one of the power utilization modules 1 can generate and transmit the control instruction executed by all the power utilization modules 1. Through the arrangement of the above solution, in a case that more than one control group requiring cooperative synchronous control is present in one space, a worker can form different control groups respectively by the plurality of power utilization modules 1; when it is necessary to control all the power utilization modules 1 of any control group in the space, it is only necessary to arrive at the closest power utilization module 1, and the control instruction is generated by the power utilization module 1; and the control instruction can be transmitted in the area through the wireless transmitter 8, and all the power utilization modules 1 can receive the control instruction, so that the same or corresponding action can be made, the inference of other control groups in the same space receiving the control instruction can be avoided, and the intelligent control is facilitated.

In this embodiment, Step A specifically includes:

A1. at least one of the power utilization modules 1 generates a group request and determines a specific identification code at the same time; and A2. other power utilization modules 1 search the group request through local area network search, then input the specific identification code and join the control group.

That is, to avoid the phenomenon that the power utilization module 1 joins the wrong control group due to a plurality of control groups in one space, according to the present invention, one specific identification code is generated when the group request is generated, the control group can be joined only after the power utilization module 1 joining the control group inputs the specific identification code. The specific identification code may be a sequence including four numbers or other conventional identification modes. In a case that it is necessary to join the currently generated control group, any power utilization module 1 in the control group can display the specific identification code so as to join the control group conveniently. After the control group is joined, information of all the power utilization modules 1 in the control group is stored in the main controllers 4 of all the power utilization modules 1, respectively. The worker can check the number of the specific power utilization modules 1 and the names of the power utilization modules 1 through administration authority.

In this embodiment, Step B specifically includes:

B1. the power utilization module 1 receives an action according to an input signal, and generates a control instruction;

B2. a main controller 4 of the power utilization module 1 receiving the signal controls the power utilization block 5 according to the control instruction through the driving module to perform a related action; and B3: transmitting the control instruction by one of the following two modes:

the main controller 4 of the power utilization module 1 receiving the signal encrypts the control instruction, and then transmits the control instruction locally by the wireless transmitter 8; and the main controller 4 of the power utilization module 1 receiving the signal uses a specific frequency band of the control group by to perform local transmission through the wireless transmitter 8.

Specifically, after the power utilization module 1 joins the control group, corresponding encryption and decryption information will be generated in the power utilization module 1, or the control instruction is transmitted by different frequency bands. This generation mode is conventional and is mainly used to ensure that the control instruction can be received and executed only in the control group. In a case that a plurality of control groups are present in one space and one power utilization module 1 receives the control instruction of other control groups, since the final instruction cannot be performed for execution, the phenomenon of instruction interference among different control groups can be avoided.

In this embodiment, Step C specifically includes:

C1. other power utilization modules 1 in the control group receive an encrypted control instruction respectively through the wireless receiver 6;

C2. other power utilization modules 1 in the control group decrypt the control instruction respectively through the main controller 4; in a case that the decryption is successful, a related action is performed according to the control instruction and then Step C3 is performed; in a case that the decryption fails, the control instruction is not received;

C3. other power utilization modules 1 in the control group transmit a successful execution signal respectively through the wireless transmitter 8, and the signal is received by the power utilization module 1 sending the encrypted control instruction; and C4. the power utilization module 1 sending the encrypted instruction, according to the received successful execution instruction, determines whether all the power utilization modules 1 of the control group execute the instruction successfully; in a case that all the power utilization modules of the control group execute the instruction successfully, the transmission of the control instruction is stopped; and in a case of determining that not all the power utilization modules 1 execute the instruction successfully within time t, the power utilization module 1 sending the encrypted instruction gives an alarm, where t is a positive real number.

For example, t may be set to 5 s, that is, when the power utilization module 1 receives the control instruction and in a case that the control instruction belongs to the control group, the power utilization module 1 will perform a related action, for example: turning on the lamp and dimming, according to the control instruction; and after the related action is performed successfully, the power utilization module 1 will transmit the successful execution instruction, and the instruction is received by the power utilization module 1 sending the encrypted instruction, where the successful execution instruction may include sending identity information of the power utilization module 1; in a case that all the power utilization modules 1 perform the actions successfully, the power utilization module 1 sending the encrypted instruction will receive the successful execution instruction of all groups in the control group, thereby not sending the encrypted instruction to reduce energy consumption; and in a case that the number of the successful execution instructions received within 5 s is insufficient, it is proved that the power utilization module 1 is separated from the control group or is in the phenomena of failure, power failure and the like, and the power utilization module 1 sending the encrypted instruction at this time will give an alarm. The worker generates the control instruction by the power utilization module 1 sending the encrypted instruction, so when the power utilization module 1 gives an alarm, the worker can know this situation rapidly and take countermeasures timely.

Specifically, in Step C2, after other power utilization modules 1 in the control group are decrypted and the related action is performed according to the control instruction, in addition to performing Step C3, the following actions are performed:

C3'. other power utilization modules 1 in the control group transmit the encrypted control instruction through the wireless transmitter 8, so that other power utilization modules 1 in a wider range can receive the encrypted control instruction; and in a case that any one of the power utilization modules 1 receives the successful execution signal, the power utilization module 1 transmits the successful execution signal to ensure that the power utilization module 1 encrypting the instruction receives the successful execution signal.

To cope with the phenomenon that the wireless transmission of part of the power utilization modules 1 cannot cover all the power utilization modules 1 due to the long distance of each power utilization module 1 in the control group, according to the present invention, after the control instruction is sent and received by other power utilization modules 1, the power utilization modules 1 receiving the instruction will send the control instruction again, thereby achieving the multi-stage transmission effect. In addition, preferably, it may be set that several specific power utilization modules 1 will send the encrypted instruction again after receiving the control instruction, and other power utilization modules 1 will only receive and execute the control instruction, thereby reducing the energy consumption and avoiding the noise caused by repeated sending of the instructions.

Specifically, between Step B2 and Step B3, the working mode further includes:

it is determined whether the control instruction is executed by the power utilization module 1 or the group, Step B3 is not performed in a case that the control instruction is executed by the power utilization module 1, and Step B3 is performed in a case that the control instruction is performed by the group. That is, the instructions generated by the power utilization modules 1 are divided into action instructions of the power utilization modules 1 and action instructions of the control group. The action instructions of the power utilization modules are executed only by the power utilization modules 1 generating the instructions, and the action instructions of the control group are sent wirelessly to be executed by all the power utilization modules 1 in the control group.

In this embodiment, in a case that any one of the power utilization modules 1 wants to quit the control group, the following steps are performed:

inputting an exit instruction through administrator permissions;

the main controller 4 encrypts the exit instruction, and then the exit instruction is transmitted by the wireless transmitter 8 to other power utilization modules 1 of the control group;

after other power utilization modules 1 of the control group receive and decrypt the exit instruction, identity information of the power utilization module 1 quitting the control group stored by the main controller 4 is deleted; and an encryption rule is deleted for the power utilization module 1 quitting the group.

To avoid the phenomena of maliciously quitting the control group and mistakenly quitting the control group, according to the present invention, administration authority is required when the control group is quit; after an administrator controls the power utilization modules 1 in a specific manner, the power utilization modules 1 can send the exit instruction, the power utilization modules 1 sending the exit instruction will delete related information of the control group, for example: an encryption mode and a decryption mode, and the main controllers 4 of other power utilization modules 1 will delete the related information of the quit power utilization modules 1, so that the quit power utilization modules 1 subsequently can join other control groups successfully, or the instructions executed by other control groups will not affect the quit power utilization modules 1.

In this embodiment, the power utilization block 5 includes a lighting module 9 and a demisting module 10. The lighting module 9 is used for lighting. The main controller 4 is further connected to a humidity sensor 11 and a touch module 12. The demisting module 10 is configured to demist a mirror surface 3 of the power utilization module 1, specifically including:

S1. a humidity of mirror surface 3 of the power utilization module 1 is sensed by the humidity sensor 11, and in a case that the humidity of the mirror surface 3 of the power utilization module 1 is greater than a preset value, Step S2 is performed;

S2. the main controller 4 controls the demisting module 10 to turn on, and the mirror surface 3 of the power utilization module 1 is heated and demisted by the demisting module 10; and S3. the main controller 4 generates a demisting instruction, and the demisting instruction is transmitted by the wireless transmitter 8, so that other power utilization modules 1 in the control group turn on the demisting module 10.

That is, based on the phenomenon that all the power utilization modules 1 in the control group are mostly in the same space, in a case that the humidity sensor 11 of one of the power utilization modules 1 senses high humidity of the mirror surface 3, other power utilization modules 1 will usually reach a preset humidity; therefore, while demisting, the power utilization modules 1 directly control other power utilization modules 1 for demisting, thereby making the whole system operate synchronously and increasing the degree of intelligence.

The demisting module 10 of this embodiment is preferably a heating film, that is, the temperature of the mirror surface 3 is increased by heating the mirror surface 3, so that the mist on the surface of the mirror surface 3 is vaporized.

In this embodiment, the cooperative synchronous control system controls different power utilization modules 1 to perform lighting with different brightness, specifically including:

the serial number is set for each power utilization module 1 joining the control group according to an established order;

selecting a preset lighting mode for execution; and according to the serial number of the corresponding power utilization module 1, the main controller 4 performs lighting according to a preset brightness, where the order of each power utilization module 1 is set according to the main controller 4 of each power utilization module 1, is transmitted to other individuals by the wireless transmitter 8 of each power utilization module 1, and is stored by the main controller 4 of each power utilization module 1.

During actual use, the lighting mode is input into the control group by the following ways:

wired connection is performed between a terminal and any power utilization module 1 in the control group;

the terminal inputs the lighting mode into the main controller 4 of the power utilization module 1; and the main controller 4 of the power utilization module 1 transmits the lighting mode to all the power utilization modules 1 in the control group through the wireless transmitter 8.

That is, in addition to making all the power utilization modules 1 perform synchronous actions, the present invention may also make all the power utilization modules 1 cooperate with each other to achieve a specific lighting effect. All the power utilization modules 1 in the control group have no priority, so only after one of the power utilization modules 1 input the related action of the lighting mode, the power utilization module 1 will send the lighting mode through the wireless transmitter 8 to other power utilization modules 1, and subsequently, only one of the power utilization modules 1 in the control group executes the lighting mode, and the lighting mode will be triggered, so that all the power utilization modules 1 receiving the a trigger instruction perform corresponding actions according to the serial numbers, and the cooperative synchronous control system has higher plasticity, thereby improving the use experience.

In addition, in this embodiment, the terminal inputs the lighting mode into the main controller 4 of the power utilization module 1, specifically including:

the terminal transmits the lighting mode completed in advance to the main controller 4 of the power utilization module 1;

a lighting mode pre-execution instruction is input through the terminal or the touch module 12; and the main controller 4 of the power utilization module 1 compares the number n of the power utilization modules 1 in the control group with the number m of the power utilization modules 1 required to execute the lighting mode, the lighting mode is transmitted to the power utilization modules 1 in the control group in a case that $n \geq m$, and the terminal is warned or an alarm is given in a case that $n < m$.

The pre-execution is equivalent to a debugging stage, so that the worker obtains whether the lighting mode can be executed or not. The executable condition of the lighting mode is $n=m$, that is, the number of the power utilization modules 1 is greater than or equal to the number of the power utilization modules 1 required by the lighting mode, thereby ensuring that the control group can execute the lighting mode. In a case that $n<m$, an inexecutable action is present, and at this time, the power utilization module 1 will give an alarm to remind the worker in debugging or troubleshooting.

In conclusion, the cooperative synchronous control system for a plurality of power utilization modules 1 provided by the present invention achieves the effect that any one of the power utilization modules 1 can send the control instruction to the whole control group. This function not only enables all the power utilization modules 1 in the control group to synchronously perform actions such as emitting light and demisting, but also enables each power utilization module 1 to perform a specific action according to a specific instruction, thereby achieving the cooperative effect.

The foregoing is merely illustrative of the preferred embodiments of the present invention and is not intended to limit the present invention in any form. Although the present invention has been disclosed as above by way of the preferred embodiments, it is not intended to limit the present invention. Any person skilled in the art may make some changes or equivalent embodiments modified as equivalent changes without departing from the scope of the present invention on the basis of the above-mentioned technical contents; any simple modifications, equivalent changes and modifications made to the foregoing embodiments without departing from the content of the technical solution of the present invention in accordance with the technical essence of the present invention is within the scope of the technical solution of the present invention.

What is claimed is:

1. A cooperative synchronous control system for a plurality of power utilization modules, comprising the plurality of power utilization modules, wherein the power utilization modules are intelligent lamp mirrors or mirror cabinets; each of the power utilization modules comprises a main controller, power utilization blocks in signal connection with the main controller, a wireless receiver and a wireless transmitter; a driving block is configured to control the on and off of the power utilization blocks and adjusting the brightness of the power utilization blocks; and the working mode of the cooperative synchronous control system is as follows:

A. generating, by at least one of the power utilization modules, a group request, and receiving the group request by other power utilization modules, so that at least two of the power utilization modules form a control group;

B. when any one of the power utilization modules generates a control instruction, controlling, by a main controller of the power utilization module, the power utilization module according to the instruction to perform a related action, and transmitting the control instruction through a wireless transmitter to the outside at the same time; and C. receiving, by other power utilization modules, the control instruction respectively through a wireless receiver, analyzing the instruction by the main controller, and performing a related control action;

wherein the power utilization block comprises a lighting module and a demisting module; the lighting module is used for lighting; the main controller is further connected to a humidity sensor and a touch module; and the demisting module is configured to demist a mirror surface of the power utilization module, specifically comprising:

S1. sensing a humidity of the mirror surface of the power utilization module by the humidity sensor, and in a case that the humidity of the mirror surface of the power utilization module is greater than a preset value, performing Step S2;

S2. controlling, by the main controller, the demisting module to turn on, and heating and demisting the mirror surface of the power utilization module by the demisting module; and S3. generating a demisting instruction by the main controller, and transmitting the demisting instruction by the wireless transmitter, so that the other power utilization modules in the control group turn on their respective demisting modules.

2. The cooperative synchronous control system for a plurality of power utilization modules according to claim 1, wherein Step B specifically comprises:

B1. receiving, by the power utilization module, an action according to an input signal, and generating a control instruction;

B2. controlling, by a main controller of the power utilization module receiving the signal, the power utilization block according to the control instruction through the driving module to perform a related action; and B3. transmitting the control instruction by one of the following two modes:

encrypting, by the main controller of the power utilization module receiving the signal, the control instruction, and then transmitting the control instruction locally by the wireless transmitter; and using a specific frequency band of the control group by the main controller of the power utilization module receiving the signal to perform local transmission through the wireless transmitter; and Step C specifically comprises:

C1. receiving, by other power utilization modules in the control group, an encrypted control instruction respectively through the wireless receiver;

C2. decrypting, by other power utilization modules in the control group, the control instruction respectively through the main controller; in a case that the decryption is successful, performing a related action according to the control instruction and then performing Step C3; in a case that the decryption fails, skipping receiving the control instruction;

C3. transmitting, by other power utilization modules in the control group, a successful execution signal respectively through the wireless transmitter, and receiving the signal by the power utilization module sending the encrypted control instruction; and C4. determining, by the power utilization module sending the encrypted instruction, according to the received successful execution instruction, whether all the power utilization modules of the control group execute the instruction successfully; in a case that all the power utilization modules of the control group execute the instruction successfully, stopping transmitting the control instruction; and in a case of determining that not all the power utilization modules execute the instruction successfully within time t, warning by the power utilization module sending the encrypted instruction, t being a positive real number.

3. The cooperative synchronous control system for a plurality of power utilization modules according to claim 2, wherein in Step C2, after other power utilization modules in the control group are decrypted and the related action is performed according to the control instruction, in addition to performing Step C3, the following actions are performed:

C3'. transmitting, by other power utilization modules in the control group, the encrypted control instruction through the wireless transmitter, so that other power utilization modules in a wider range are capable of receiving the encrypted control instruction; and in a case that any one of the power utilization modules receives the successful execution signal, transmitting the successful execution signal by the power utilization module so as to ensure that the power utilization module encrypting the instruction receives the successful execution signal.

4. The cooperative synchronous control system for a plurality of power utilization modules according to claim 2, between Step B2 and Step B3, further comprising:

determining whether the control instruction is executed by the power utilization module or the group, skipping performing Step B3 in a case that the control instruction is executed by the power utilization module, and performing Step B3 in a case that the control instruction is performed by the group.

5. The cooperative synchronous control system for a plurality of power utilization modules according to claim 1, wherein in a case that any one of the power utilization modules wants to quit the control group, performing the following steps:

inputting an exit instruction through administrator permissions;

encrypting the exit instruction by the main controller, and then transmitting the exit instruction by the wireless transmitter to other power utilization modules of the control group;

after other power utilization modules of the control group receive and decrypt the exit instruction, deleting identity information of the power utilization module quitting the control group stored by the main controller; and deleting an encryption rule for the power utilization module quitting the group.

6. The cooperative synchronous control system for a plurality of power utilization modules according to claim 1, wherein the cooperative synchronous control system controls different power utilization modules to perform lighting with different brightness, specifically comprising:

setting the serial number for each power utilization module joining the control group according to an established order;

selecting a preset lighting mode for execution; and according to the serial number of the corresponding power utilization module, performing lighting by the main controller according to a preset brightness, wherein the order of each power utilization module is set according to the main controller of each power utilization module, is transmitted to other individuals by the wireless transmitter of each power utilization module, and is stored by the main controller of each power utilization module.

7. The cooperative synchronous control system for a plurality of power utilization modules according to claim 6, wherein the lighting mode is input into the control group by the following ways:

performing wired connection between a terminal and any power utilization module in the control group;

inputting the lighting mode into the main controller of the power utilization module by the terminal; and transmitting, by the main controller of the power utilization module, the lighting mode to all the power utilization modules in the control group through the wireless transmitter.

8. The cooperative synchronous control system for a plurality of power utilization modules according to claim 7, wherein the inputting the lighting mode into the main controller of the power utilization module by the terminal specifically comprises:

transmitting, by the terminal, the lighting mode completed in advance to the main controller of the power utilization module;

inputting a lighting mode pre-execution instruction through the terminal or the touch module; and comparing, by the main controller of the power utilization module, the number n of the power utilization modules in the control group with the number m of the power utilization modules required to execute the lighting mode, transmitting the lighting mode to other power utilization modules in the control group in a case that n≥m, and warning the terminal or giving an alarm in a case that n<m.

* * * * *